United States Patent
Xu et al.

(10) Patent No.: US 12,476,868 B2
(45) Date of Patent: Nov. 18, 2025

(54) NETWORK MODEL MANAGEMENT METHOD AND APPARATUS

(71) Applicant: HUAWEI TECHNOLOGIES CO., LTD., Guangdong (CN)

(72) Inventors: Ruiyue Xu, Shanghai (CN); Lan Zou, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 18/475,622

(22) Filed: Sep. 27, 2023

(65) Prior Publication Data

US 2024/0022470 A1    Jan. 18, 2024

Related U.S. Application Data

(63) Continuation of application No. PCT/CN2022/080646, filed on Mar. 14, 2022.

(30) Foreign Application Priority Data

Mar. 30, 2021    (CN) .......................... 202110342803.5

(51) Int. Cl.
*H04L 41/082* (2022.01)
*H04L 41/0823* (2022.01)

(52) U.S. Cl.
CPC ........ *H04L 41/082* (2013.01); *H04L 41/0823* (2013.01)

(58) Field of Classification Search
CPC .......................... H04L 41/082; H04L 41/0823
See application file for complete search history.

(56) References Cited

U.S. PATENT DOCUMENTS

| | | | | |
|---|---|---|---|---|
| 2017/0257279 | A1* | 9/2017 | Mishra | H04L 41/0856 |
| 2020/0351171 | A1* | 11/2020 | Ozonat | H04L 41/16 |
| 2024/0007414 | A1* | 1/2024 | Jain | G06F 9/5088 |

FOREIGN PATENT DOCUMENTS

| | | |
|---|---|---|
| CN | 110569288 A | 12/2019 |
| CN | 112307607 A | 2/2021 |

OTHER PUBLICATIONS

"3rd Generation Partnership Project; Technical Specification Group Services and System Aspects; Architecture enhancements for 5G System (5GS) to support network data analytics services (Release 17)," 3GPP TS 23.288 V17.0.0 (Mar. 2021) France, Mar. 2021 (Mar. 29, 2021), XP051990930; 157 total pages.

(Continued)

*Primary Examiner* — Kristie D Shingles
(74) *Attorney, Agent, or Firm* — Rimon PC

(57) ABSTRACT

This application provides a network model management method applied to a first device. The method includes obtaining first information of a network model, determining second information based on the first information, and sending the first and second information to a second device. The first information describes the network model. The second information indicates a network analysis function, and the network analysis function is allowed to use the network model. The foregoing method is used, so that the second device can establish an association relationship between the network model and the network analysis function, to implement real-time management for the network model.

18 Claims, 5 Drawing Sheets

(56) References Cited

OTHER PUBLICATIONS

3rd Generation Partnership Project; Technical Specification Group Services and System Aspects; Study on enablers for network automation for the SG System (SGS); Phase 2 (Release 17), 3GPP TR 23700-91 V17.0.0 (Dec. 2020), total 382 pages.

3rd Generation Partnership Project; Technical Specification Group Services and System Aspects; Management and orchestration; Study on enhancement of Management Data Analytics (MDA) (Release 17), 3GPP TR 28.809 V1.1.0 (Nov. 2020), total 93 pages.

3rd Generation Partnership Project; Technical Specification Group RAN; Evolved Universal Terrestrial Radio Access (E-UTRA) and NR; Study on enhancement for Data Collection for NR and EN-DC (Release 17), 3GPP TR 37.817 V0.1.0 (Jan. 2021), total 8 pages.

* cited by examiner

NETWORK MODEL MANAGEMENT METHOD AND APPARATUS

CROSS-REFERENCE TO RELATED APPLICATIONS

This application is a continuation of International Application No. PCT/CN2022/080646, filed on Mar. 14, 2022, which claims priority to Chinese Patent Application No. 202110342803.5, filed on Mar. 30, 2021. The disclosures of the aforementioned applications are hereby incorporated by reference in their entireties.

TECHNICAL FIELD

This application relates to the field of communications technologies, and more specifically, to a network model management method and an apparatus.

BACKGROUND

Artificial intelligence (AI) is new technical science that studies and develops theories, methods, techniques, and application systems for simulating, extending, and expanding human intelligence. Currently, to implement a specific intelligent function, a network device depends on an external input AI model. In a scenario in which there are a plurality of AI models and the AI models are continuously trained and updated, how to manage the AI models is an urgent problem to be resolved.

SUMMARY

This application provides a network model management method and an apparatus. Network model management can be implemented based on the methods and the apparatus disclosed herein.

According to a first aspect, a network model management method applied to a first device is provided. The method includes: obtaining first information of a network model, where the first information describes the network model; determining second information based on the first information, where the second information indicates a network analysis function, and the network analysis function is allowed to use the network model; and sending the first information and the second information.

According to the solution provided in this application, the first device obtains the first information that describes the network model, and determines, based on the first information, the network analysis function associated with the network model, so that a second device, after receiving the first information and the second information, establishes an association relationship between the network model and the network analysis function, to implement real-time management for the network model.

With reference to the first aspect, in some implementations of the first aspect, the determining of the second information based on the first information includes: determining the second information based on information about a first parameter included in the first information. The information about the first parameter includes one or more of the following: provider information of the network model, capability information corresponding to the network model, or application scope information corresponding to the network model. The provider information of the network model indicates a vendor or an operator that provides the network model, and the application scope information corresponding to the network model indicates a scope in which the network model is allowed to be used.

With reference to the first aspect, in some implementations of the first aspect, the first information further includes third information, and the third information includes one or more of the following: identification information of the network model, version information of the network model, file name information of the network model, file address information of the network model, status information of the network model, sharing information of the network model, or self-training information of the network model. The status information indicates whether the network model is allowed to be used, the sharing information indicates whether the network model is allowed to be used by a plurality of network analysis functions at the same time, and the self-training information indicates whether the network model is allowed to be updated locally.

With reference to the first aspect, in some implementations of the first aspect, the second information includes one or more of the following: provider information of the network analysis function, application scope information corresponding to the network analysis function, capability information corresponding to the network analysis function, or identification information of the network analysis function. The provider information of the network analysis function indicates a vendor or an operator that provides the network analysis function, and the application scope information corresponding to the network analysis function indicates a scope in which the network analysis function is allowed to be used.

With reference to the first aspect, in some implementations of the first aspect, that the first device obtains first information of a network model includes: the first device obtains the first information from a third device; or the first device trains the network model to generate the first information.

With reference to the first aspect, in some implementations of the first aspect, the method further includes: receiving a second response message, where the second response message indicates whether an association relationship between the network model and the network analysis function is successfully established.

According to the solution provided in this application, if the second response message indicates that the association relationship between the network model and the network analysis function is not successfully established, the first device may resend indication information to the second device, to ensure that the association relationship between the network model and the network analysis function is established.

With reference to the first aspect, in some implementations of the first aspect, when the second response message includes the identification information of the network model and the identification information of the network analysis function, the second response message indicates that the association relationship between the network model and the network analysis function is successfully established.

According to the solution provided in this application, if the second response message includes the identification information of the network model and the identification information of the network analysis function, it is equivalent to implicitly indicating that the association relationship between the network model and the network analysis function is successfully established. Certainly, the second response message may alternatively indicate, in an explicit manner, whether the association relationship between the network model and the network analysis function is successfully established.

According to a second aspect, a network model management method applied to a second device is provided. The method includes: receiving first information and second information from a first device, where the first information describes a network model, the second information indicates a network analysis function, the network analysis function is allowed to use the network model, and the second information is determined by the first device based on the first information; and establishing an association relationship between the network model and the network analysis function based on the first information and the second information.

According to the solution provided in this application, the first device obtains the first information that describes the network model, and determines, based on the first information, the network analysis function associated with the network model, so that the second device establishes the association relationship between the network model and the network analysis function, to implement real-time management for the network model.

With reference to the second aspect, in some implementations of the second aspect, the first information includes information about a first parameter and third information. The information about the first parameter includes one or more of the following: provider information of the network model, capability information corresponding to the network model, or application scope information corresponding to the network model. The third information includes one or more of the following: identification information of the network model, version information of the network model, file name information of the network model, file address information of the network model, status information of the network model, sharing information of the network model, self-training information of the network model, provider information of the network model, capability information corresponding to the network model, or application scope information corresponding to the network model. The provider information of the network model indicates a vendor or an operator that provides the network model, the application scope information corresponding to the network model indicates a scope in which the network model is allowed to be used, the status information indicates whether the network model is allowed to be used, the sharing information indicates whether the network model is allowed to be used by a plurality of network analysis functions at the same time, and the self-training information indicates whether the network model is allowed to be updated locally.

With reference to the second aspect, in some implementations of the second aspect, the second information includes one or more of the following: provider information of the network analysis function, application scope information corresponding to the network analysis function, capability information corresponding to the network analysis function, or identification information of the network analysis function. The provider information of the network analysis function indicates a vendor or an operator that provides the network analysis function, and the application scope information corresponding to the network analysis function indicates a scope in which the network analysis function is allowed to be used.

According to the solution of this application, the second information may explicitly or implicitly indicate the identification information of the network analysis function.

With reference to the second aspect, in some implementations of the second aspect, when the second information does not include the identification information of the network analysis function, the method further includes: determining the identification information of the network analysis function based on one or more of the provider information of the network analysis function, the application scope information corresponding to the network analysis function, and the capability information corresponding to the network analysis function.

With reference to the second aspect, in some implementations of the second aspect, the method includes: configuring, in a first management object corresponding to the network model, the first information, where the first management object is used to describe configuration information of the network model.

With reference to the second aspect, in some implementations of the second aspect, the establishing an association relationship between the network model and the network analysis function based on the first information and the second information includes: configuring, in the first management object corresponding to the network model, the identification information of the network analysis function, where the first management object is used to describe the configuration information of the network model; configuring, in a second management object corresponding to the network analysis function, the identification information of the network model, where the second management object is used to describe configuration information of the network analysis function; or configuring, in a third management object, the identification information of the network analysis function and the identification information of the network model.

With reference to the second aspect, in some implementations of the second aspect, the method further includes: sending a second response message, where the second response message indicates whether the association relationship between the network model and the network analysis function is successfully established.

With reference to the second aspect, in some implementations of the second aspect, when the second response message includes the identification information of the network model and the identification information of the network analysis function, the second response message indicates that the association relationship between the network model and the network analysis function is successfully established.

According to a third aspect, a network model management method applied to a first device is provided. The method includes: obtaining information about a first parameter of the network model; determining, based on the first parameter, a network analysis function associated with the network model, where the network analysis function corresponds to the first parameter; and sending first indication information, where the first indication information indicates to associate the network model with the network analysis function, the first indication information includes second information and identification information of the network model, and the second information indicates the network analysis function.

According to the solution provided in this application, the first device obtains the information about the first parameter that describes the network model, and determines, based on the information about the first parameter, the network analysis function associated with the network model, so that a second device establishes an association relationship between the network model and the network analysis function, to implement real-time management for the network model.

With reference to the third aspect, in some implementations of the third aspect, the first parameter indicates one or more of the following: provider information of the network model, capability information corresponding to the network model, or application scope information corresponding to the network model. The provider information of the network model indicates a vendor or an operator that provides the network model, and the application scope information corresponding to the network model indicates a scope in which the network model is allowed to be used.

With reference to the third aspect, in some implementations of the third aspect, the second information includes one or more of the following: provider information of the network analysis function, application scope information corresponding to the network analysis function, capability information corresponding to the network analysis function, or identification information of the network analysis function. The provider information of the network analysis function indicates a vendor or an operator that provides the network analysis function, and the application scope information corresponding to the network analysis function indicates a scope in which the network analysis function is allowed to be used.

With reference to the third aspect, in some implementations of the third aspect, the method further includes: obtaining third information of the network model, where the third information includes one or more of the following: identification information of the network model, version information of the network model, file name information of the network model, file address information of the network model, status information of the network model, sharing information of the network model, or self-training information of the network model; where the status information indicates whether the network model is allowed to be used, the sharing information indicates whether the network model is allowed to be used by a plurality of network analysis functions at the same time, and the self-training information indicates whether the network model is allowed to be updated locally; and sending the information about the first parameter and the third information.

With reference to the third aspect, in some implementations of the third aspect, the obtaining information about a first parameter of the network model, and the obtaining third information of the network model include: the first device obtains the information about the first parameter and the third information from a third device; or the first device trains the network model, to generate the information about the first parameter and the third information.

With reference to the third aspect, in some implementations of the third aspect, the method further includes: receiving a second response message, where the second response message indicates whether the association relationship between the network model and the network analysis function is successfully established.

With reference to the third aspect, in some implementations of the third aspect, when the second response message includes the identification information of the network model and the identification information of the network analysis function, the first response information indicates that the association relationship between the network model and the network analysis function is successfully established.

According to a fourth aspect, a network model management method applied to a second device is provided. The method includes: receiving first indication information, where the first indication information indicates to associate a network model with a network analysis function, the first indication information includes second information and identification information of the network model, the second information indicates the network analysis function, the network analysis function is determined by the first device based on a first parameter of the network model, and the network analysis function corresponds to the first parameter; and establishing an association relationship between the network model and the network analysis function based on the first indication information.

According to the solution provided in this application, the first device obtains the information about the first parameter that describes the network model, and determines, based on the information about the first parameter, the network analysis function associated with the network model, so that a second device establishes an association relationship between the network model and the network analysis function, to implement real-time management for the network model.

With reference to the fourth aspect, in some implementations of the fourth aspect, the first parameter indicates one or more of the following: provider information of the network model, capability information corresponding to the network model, or application scope information corresponding to the network model. The provider information of the network model indicates a vendor or an operator that provides the network model, and the application scope information corresponding to the network model indicates a scope in which the network model is allowed to be used.

With reference to the fourth aspect, in some implementations of the fourth aspect, the second information includes one or more of the following: provider information of the network analysis function, application scope information corresponding to the network analysis function, capability information corresponding to the network analysis function, or identification information of the network analysis function. The provider information of the network analysis function indicates a vendor or an operator that provides the network analysis function, and the application scope information corresponding to the network analysis function indicates a scope in which the network analysis function is allowed to be used.

With reference to the fourth aspect, in some implementations of the fourth aspect, when the second information does not include the identification information of the network analysis function, the method further includes: determining the identification information of the network analysis function based on one or more of the provider information of the network analysis function, the application scope information corresponding to the network analysis function, and the capability information corresponding to the network analysis function.

With reference to the fourth aspect, in some implementations of the fourth aspect, the method further includes: receiving the information about the first parameter and third information, where the third information includes one or more of the following: identification information of the network model, version information of the network model, file name information of the network model, file address information of the network model, status information of the network model, sharing information of the network model, or self-training information of the network model; where the status information indicates whether the network model is allowed to be used, the sharing information indicates whether the network model is allowed to be used by a plurality of network analysis functions at the same time, and the self-training information indicates whether the network model is allowed to be updated locally; and configuring, in a first management object corresponding to the network model, the information about the first parameter and the third information, where the first management object describes configuration information of the network model.

With reference to the fourth aspect, in some implementations of the fourth aspect, the establishing an association relationship between the network model and the network analysis function based on the first indication information includes: configuring, in the first management object corresponding to the network model, the identification information of the network analysis function, where the first management object is used to describe the configuration information of the network model; configuring, in a second management object corresponding to the network analysis function, the identification information of the network model, where the second management object is used to describe configuration information of the network analysis function; or configuring, in a third management object, the identification information of the network analysis function and the identification information of the network model.

With reference to the fourth aspect, in some implementations of the fourth aspect, the method further includes: receiving a second response message, where the second response message indicates whether the association relationship between the network model and the network analysis function is successfully established.

With reference to the fourth aspect, in some implementations of the fourth aspect, when the second response message includes the identification information of the network model and the identification information of the network analysis function, the first response information indicates that the association relationship between the network model and the network analysis function is successfully established.

According to a fifth aspect, a first device is provided. The first device includes a unit (e.g., one or more processing circuits) configured to perform the method in any possible implementation of the first aspect or the third aspect.

According to a sixth aspect, a second device is provided. The second device includes a unit (e.g., one or more processing circuits) configured to perform the method in any possible implementation of the second aspect or the fourth aspect.

According to a seventh aspect, a computer-readable medium is provided. The computer-readable medium stores a computer program (which may also be referred to as code or an instruction). When the computer program runs on a computer, the computer is enabled to perform the method in any one of the possible implementations of the first aspect to the fourth aspect.

According to an eighth aspect, a communication system is provided. The communication system includes a first device and a second device, and the first device is configured to perform the method in any possible implementation of the first aspect or the third aspect. The second device is configured to perform the method in any possible implementation of the second aspect or the fourth aspect.

According to a ninth aspect, a network model management method is provided. The method includes: the first device obtains first information of a network model, where the first information describes the network model; the first device determines second information based on the first information, where the second information indicates a network analysis function, and the network analysis function is allowed to use the network model; the first device sends the first information and the second information; the second device receives the first information and the second information; and the second device establishes an association relationship between the network model and the network analysis function based on the first information and the second information.

With reference to the ninth aspect, in some implementations of the ninth aspect, that the first device determines second information based on the first information includes: the first device determines the second information based on information about a first parameter included in the first information. The information about the first parameter includes one or more of the following: provider information of the network model, capability information corresponding to the network model, or application scope information corresponding to the network model. The provider information of the network model indicates a vendor or an operator that provides the network model, and the application scope information corresponding to the network model indicates a scope in which the network model is allowed to be used.

With reference to the ninth aspect, in some implementations of the ninth aspect, the first information further includes third information, and the third information includes one or more of the following: identification information of the network model, version information of the network model, file name information of the network model, file address information of the network model, status information of the network model, sharing information of the network model, or self-training information of the network model. The status information indicates whether the network model is allowed to be used, the sharing information indicates whether the network model is allowed to be used by a plurality of network analysis functions at the same time, and the self-training information indicates whether the network model is allowed to be updated locally.

With reference to the ninth aspect, in some implementations of the ninth aspect, the second information includes one or more of the following: provider information of the network analysis function, application scope information corresponding to the network analysis function, capability information corresponding to the network analysis function, or identification information of the network analysis function. The provider information of the network analysis function indicates a vendor or an operator that provides the network analysis function, and the application scope information corresponding to the network analysis function indicates a scope in which the network analysis function is allowed to be used.

With reference to the ninth aspect, in some implementations of the ninth aspect, when the second information does not include the identification information of the network analysis function, the method further includes: the second device determines the identification information of the network analysis function based on one or more of the provider information of the network analysis function, the application scope information corresponding to the network analysis function, or the capability information corresponding to the network analysis function.

With reference to the ninth aspect, in some implementations of the ninth aspect, that the first device obtains first information of a network model includes: the first device obtains the first information from a third device; or the first device trains the network model to generate the first information.

With reference to the ninth aspect, in some implementations of the ninth aspect, the method further includes: the second device configures, in a first management object corresponding to the network model, the first information, where the first management object is used to describe configuration information of the network model.

With reference to the ninth aspect, in some implementations of the ninth aspect, that the second device establishes an association relationship between the network model and the network analysis function based on the first information and the second information includes: the second device configures, in the first management object corresponding to the network model, the identification information of the network analysis function, where the first management object is used to describe the configuration information of the network model; the second device configures, in a second management object corresponding to the network analysis function, the identification information of the network model, where the second management object is used to describe configuration information of the network analysis function; or the second device configures, in a third management object, the identification information of the network analysis function and the identification information of the network model.

With reference to the ninth aspect, in some implementations of the ninth aspect, the method further includes: the second device sends a second response message, where the second response message indicates whether the association relationship between the network model and the network analysis function is successfully established. The first device receives the second response message.

With reference to the ninth aspect, in some implementations of the ninth aspect, when the second response message includes the identification information of the network model and the identification information of the network analysis function, the second response message indicates that the association relationship between the network model and the network analysis function is successfully established.

According to a tenth aspect, a chip is provided. A processing circuit is disposed on the chip, and the processing circuit is configured to perform the method in any possible implementation of the first aspect to the fourth aspect.

DESCRIPTION OF EMBODIMENTS

The following describes technical solutions of this application with reference to accompanying drawings.

A network model in this specification includes an AI model and a machine learning (ML) model. AI models and ML models are essentially mathematical models that generate prediction results by searching for patterns in data. The following uses a network model as an AI model for description.

Figure 1:
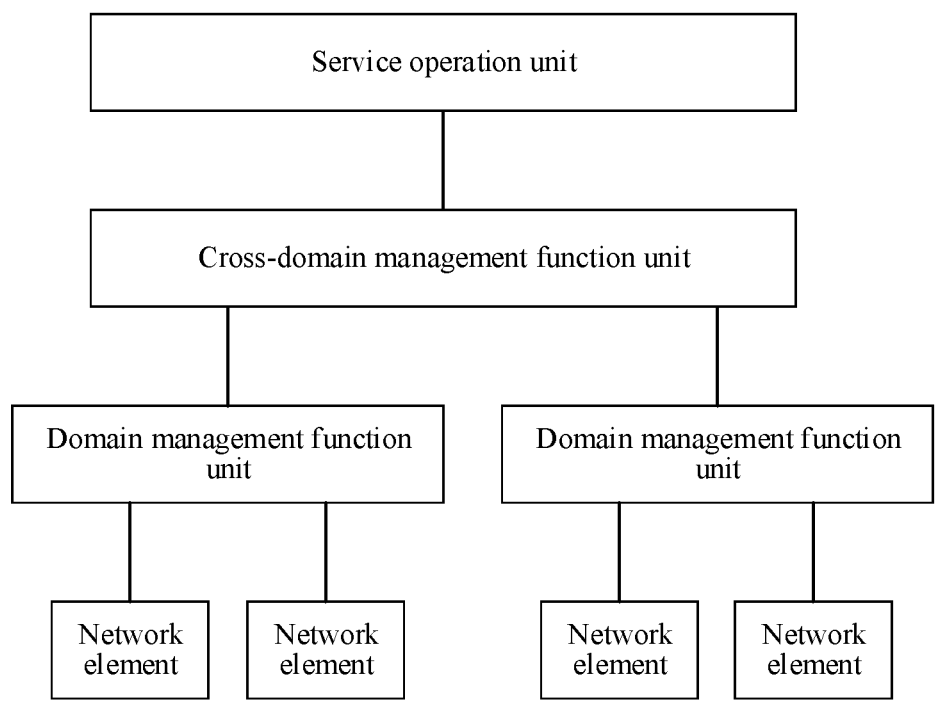
FIG. 1 shows a system architecture to which an embodiment of this application is applicable.

The technical solutions provided in this application may be applied to a system architecture shown in FIG. 1. A service operation unit may also be referred to as a communication service management function unit, and includes an operation system of an operator or an operation system of a vertical industry. A cross-domain management function unit may also be referred to as a network management function unit, and may be used for model training of an AI model and model inference of an AI model. A domain management function unit may also be referred to as a subnet management function unit or a network element management function unit, and may be used for model training of an AI model and model inference of an AI model. A network element is an entity that provides a network service, and includes a core network element and an access network element, and may provide at least one of model training of an AI model or model inference of an AI model.

Model training is a process of finding configuration parameters and determining a model by using a large amount of data to achieve an objective of a high recognition rate. The model training mainly describes a relationship between data. Model inference, which may also be referred to as intelligent analysis, is to use a model to provide an analysis result, for example, determine a network parameter configuration set based on a current network environment.

A first device in this specification may be a cross-domain management function unit, and a second device may be a domain management function unit. It should be understood that the first device and the second device may alternatively be other units.

The network analysis function in this specification may be an independent entity unit, or may be a logical function in an entity unit. This is not limited in this application.

Figure 2:
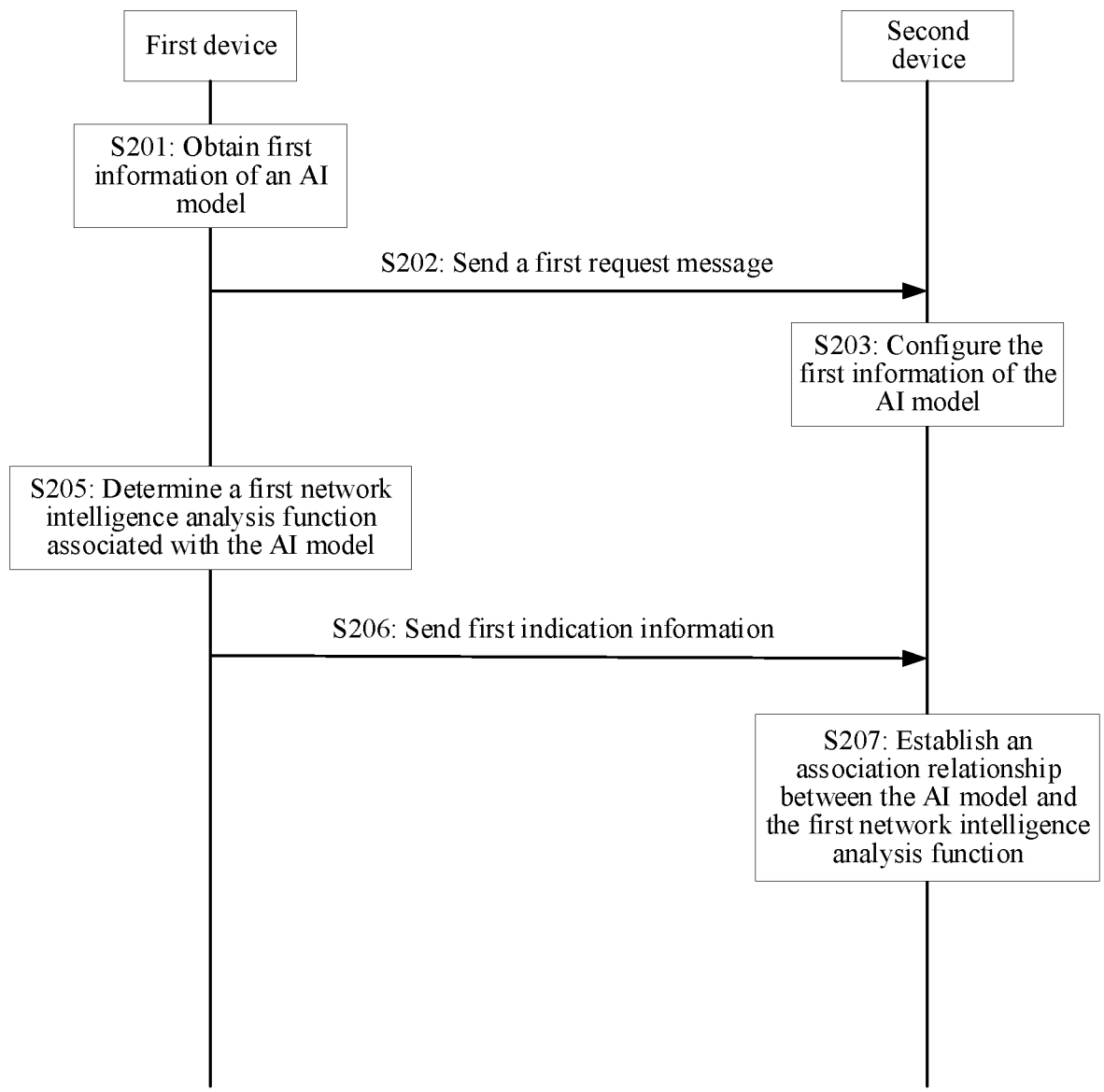
FIG. 2 shows an implementation of solutions provided in this application.

FIG. 2 shows an implementation of the solutions provided in this application. Details are as follows:

S201: A first device obtains first information of an AI model.

The first information is used to describe a feature of the AI model, and the first information includes information about a first parameter and third information.

The information about the first parameter includes one or more of the following:

provider information of the AI model, capability information corresponding to the AI model, and application scope information corresponding to the AI model.

The provider information of the AI model is used to describe a provider of the AI model, and the provider may be a vendor or an operator that provides the AI model.

The capability information corresponding to the AI model indicates a capability of the AI model.

For example, the capability information of the AI model may include one or more of the following:

load information analysis capability, service experience analysis capability, network performance analysis capability, congestion analysis capability, quality of service (QoS) analysis capability, energy saving analysis capability, traffic flow direction analysis capability, or terminal device track analysis capability.

The application scope information corresponding to the AI model indicates a scope in which the AI model can be applied.

For example, the application scope information corresponding to the AI model includes at least one of geographical scope information, network element scope information, cell scope information, or network slice scope information.

The third information includes one or more of the following:

identification information of the AI model, version information of the AI model, file name information of the AI model, file address information of the AI model, status information of the AI model, sharing information of the AI model, or self-training information of the AI model.

The file address information of the AI model indicates a storage location of the AI model file, for example, may be a uniform resource identifier (URI) corresponding to the file storage location.

The status information of the AI model indicates whether the AI model is allowed to be used. The sharing information of the AI model indicates whether the AI model can be used by a plurality of network analysis functions at the same time. The self-training information of the AI model indicates whether the AI model is allowed to be updated locally.

The following describes a manner in which the first device obtains the first information.

Manner 1:

The first device obtains the first information from a third device.

For example, the foregoing information may be manually configured in the first device.

Manner 2:

The first device trains the AI model, to generate the first information.

For example, the first device may first receive initial information of the AI model in a manual configuration manner, and then the first device may train the AI model. After the AI model is trained, the first device determines whether to update the initial information of the AI model.

It should be understood that if the first device does not update the initial information of the AI model, the first information of the AI model obtained by the first device is the initial information of the AI model. If the first device updates the initial information of the AI model, the first information of the AI model obtained by the first device is information obtained after the initial information of the AI model is updated.

For example, after the AI model is trained, the first device re-allocates an identifier to the AI model, and the first device updates initial identification information of the AI model.

For example, after the AI model is trained, the first device obtains an AI model of a new version, and the first device updates initial version information of the AI model. It is assumed that the initial version information of the AI model is a version 1, initial version information of the AI model may be updated to a version 2 after training. In a possible implementation, a time of completing training of the AI model may be used as the version information of the AI model. How to represent the version information of the AI model is not limited in this application.

For example, after the AI model is trained, the first device re-allocates a file name and a file address to the AI model, and the first device separately updates initial file name information and initial file address information of the AI model.

For example, before the AI model is trained, status information of the AI model indicates that the AI model is not available. After the AI model is trained, the AI model become available. In this case, the first device updates the initial status information of the AI model.

For example, before the AI model is trained, sharing information of the AI model indicates that the AI model is not allowed to be used by a plurality of network analysis functions at the same time. After the AI model is trained, if the AI model is allowed to be used by a plurality of network analysis functions at the same time, the first device updates the initial sharing information of the AI model.

For example, before the AI model is trained, self-training information of the AI model indicates that the AI model is not allowed to be updated locally. After the AI model is trained, the AI model is allowed to be updated locally. In this case, the first device updates the initial self-training information of the AI model.

For example, before the AI model is trained, the capability information of the AI model indicates that the AI model has a load information analysis capability. After the AI model is trained, if the AI model has a new service experience analysis capability, the first device updates the initial capability information of the AI model. In a possible implementation, the capability information of the trained AI model may be manually specified in advance.

For example, before the AI model is trained, the application scope information of the AI model indicates that the AI model may be applied in a cell #1 and a cell #2. After the AI model is trained, if the AI model does not support being applied in the cell #2, the first device updates the initial application scope information of the AI model. In a possible implementation, the application scope information of the trained AI model may be manually specified in advance.

S202: The first device sends a first request message to a second device, where the first request message is used to request the second device to configure the first information of the AI model. Subsequently, the second device receives the first request message.

The first request message includes the first information of the AI model and an identifier of a first management object corresponding to the AI model. The first management object corresponding to the AI model describes configuration information of the AI model. For example, the first management object may be a data structure or a file corresponding to the AI model.

S203: The second device configures the first information of the AI model based on the first request message.

In a possible implementation, the second device configures, in the first management object corresponding to the AI model, the first information of the AI model based on the first request message.

Optionally, the following steps are performed. S204: The second device sends a first response message to the first device. The first response message indicates that the second device successfully configures the first information of the AI model.

S205: The first device determines, based on the information about the first parameter included in the first information, a first network analysis function associated with the AI model.

That the first network analysis function is associated with the AI model in this specification means that the first network analysis function may use the AI model. It should be understood that the first network analysis function may be one or more network analysis functions.

The following describes several manners in which the first device determines the first network analysis function associated with the AI model.

Manner 1:

The first device determines, based on the provider information of the AI model in the first information, the first network analysis function associated with the AI model, where a provider of the first network analysis function is the same as the provider of the AI model. It should be understood that the provider information of each of the plurality of network analysis functions is configured in the first device.

For example, the provider information of an AI model #1 indicates that the AI model #1 is provided by an operator #1, and the provider information of a network analysis function #1 indicates that the network analysis function #1 is provided by the operator #1, and the provider information of a network analysis function #2 indicates that the network analysis function #1 is provided by an operator #2. In this case, the first device determines that a first network analysis function associated with the AI model #1 is the network analysis function #1.

Manner 2:

The first device determines, based on the capability information of the AI model in the first information, the first network analysis function associated with the AI model. It should be understood that capability information of each of the plurality of network analysis functions is configured in the first device.

For example, the capability information of an AI model #1 indicates that the AI model #1 has a load information analysis capability, the capability information of a network analysis function #1 indicates that the network analysis function #1 has a load information analysis capability, and the capability information of a network analysis function #2 indicates that the network analysis function #2 has a service experience analysis capability. In this case, the first device determines that a first network analysis function associated with the AI model #1 is the network analysis function #1.

Manner 3:

The first device determines, based on the application scope information of the AI model in the first information, the first network analysis function associated with the AI model. It should be understood that the application scope information of the plurality of network analysis functions is configured in the first device.

For example, the application scope information of an AI model #1 indicates that the AI model #1 is applied to a cell #1, and the application scope information of a network analysis function #1 indicates that the network analysis function #1 is applied to the cell #1; and the application scope information of a network analysis function #2 indicates that the network analysis function #2 is applied to a cell #2. In this case, the first device determines that a first network analysis function associated with the AI model #1 is the network analysis function #1.

In the foregoing Manner 1 to Manner 3, the first device determines, based on one of the provider information of the AI model, the application type information of the AI model, or the application scope information of the AI model, the first network analysis function associated with the AI model. The first device may alternatively determine, based on at least two of the provider information of the AI model, the application type information of the AI model, and the application scope information of the AI model, the first network analysis function associated with the AI model. The following provides a possible manner 4.

Manner 4:

The first device determines, based on the provider information of the AI model and the capability information of the AI model, the first network analysis function associated with the AI model. It should be understood that the provider information and capability information of each of the plurality of network analysis functions are configured in the first device.

For example, the provider information of an AI model #1 indicates that the AI model #1 is provided by an operator #1, and the capability information of the AI model #1 indicates that the AI model #1 has a load information analysis capability; the provider information of a network analysis function #1 indicates that the network analysis function #1 is provided by the operator #1, and the capability information of the network analysis function #1 indicates that the network analysis function #1 has a load information analysis capability; the provider information of a network analysis function #2 indicates that the network analysis function #1 is provided by an operator #2, and the capability information of the network analysis function #2 indicates that the network analysis function #2 has a service experience analysis capability; and the provider information of a network analysis function #3 indicates that the network analysis function #3 is provided by the operator #1, and the capability information of the network analysis function #3 indicates that the network analysis function #3 has a service experience analysis capability. In this case, the first device determines that a first network analysis function associated with the AI model #1 is the network analysis function #1.

It should be understood that the examples described in Manner 1 to Manner 4 are merely examples for description, and this is not limited in this application.

It should be understood that, after the first device determines, based on the information about the first parameter included in the first information, the first network analysis function associated with the AI model, the first device may determine second information. The second information indicates the first network analysis function associated with the AI model. The second information includes one or more of the following:

provider information of the first network analysis function, application scope information corresponding to the first network analysis function, capability information corresponding to the first network analysis function, and identification information of the first network analysis function.

S206: The first device sends first indication information to the second device, where the first indication information indicates the second device to establish an association relationship between the AI model and the first network analysis function. Correspondingly, the second device receives the first indication information.

The first indication information includes the second information and the identification information of the AI model.

S207: The second device establishes the association relationship between the AI model and the first network analysis function based on the first indication information.

When the second information does not include the identification information of the first network analysis function, the second device may determine the identification information of the first network analysis function based on one or more of the provider information of the first network analysis function, the application scope information corresponding to the first network analysis function, or the capability information corresponding to the first network analysis function.

The following describes a manner in which the second device establishes the association relationship between the AI model and the network analysis function.

Manner 1:

The second device configures, in the first management object corresponding to the AI model, the identification information of the first network analysis function.

Manner 2:

The second device configures, in a second management object corresponding to the first network analysis function, the identification information of the AI model.

It should be understood that the second management object describes configuration information of the first network analysis function. For example, the second management object may be a data structure or a file corresponding to the first network analysis function.

Manner 3:

The second device creates a third management object, and configures, in the third management object, the identification information of the AI model and the identification information of the first network analysis function. There is a correspondence between the identification information of the AI model and the identification information of the first network analysis function.

It should be understood that the third management object is another management object besides the first management object and the second management object.

Optionally, the following step is performed. S208: The second device sends a second response message to the first device, where the second response message indicates whether the second device successfully establishes the association relationship between the AI model and the first network analysis function. Correspondingly, the first device receives the second response message.

In a possible implementation, when the second response message includes the identification information of the AI model and the identification information of the first network analysis function, the second response message indicates that the second device successfully establishes the association relationship between the AI model and the first network analysis function.

It should be understood that, this application imposes no limitation on information used in the second response message to indicate whether the second device successfully establishes the association relationship between the AI model and the first network analysis function.

Currently, when a plurality of AI models exist and the AI models are continuously trained and updated, the network device does not know how to apply the AI models, and cannot manage the AI models. According to the solutions provided in this application, the first device obtains the first information that describes an AI model, and determines, based on the first information, the network analysis function associated with the AI model, so that the second device establishes the association relationship between the AI model and the network analysis function, to implement real-time management of the AI model.

Figure 3:
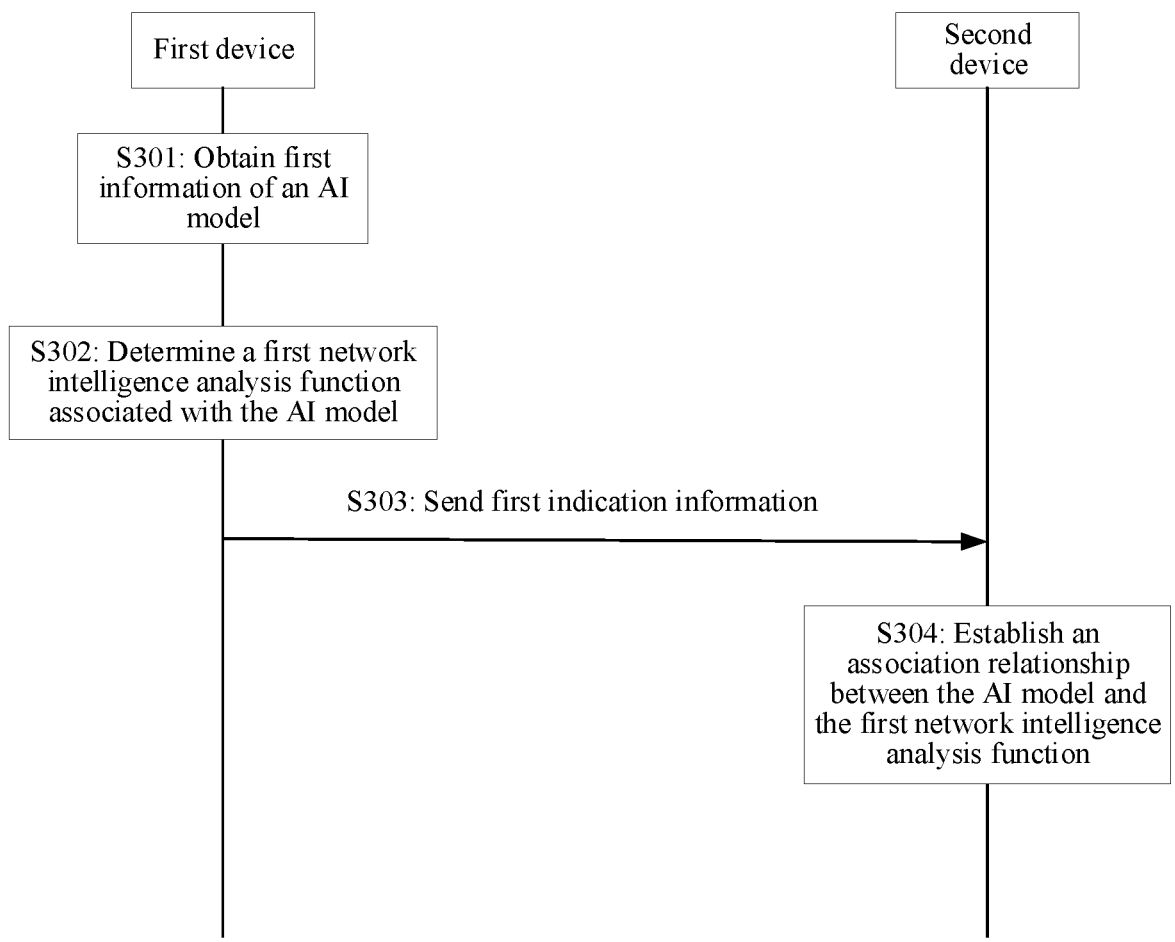
FIG. 3 shows another implementation of solutions provided in this application.

FIG. 3 shows another implementation of the solutions provided in this application. Details are as follows:

S301: A first device obtains first information of an AI model.

This process may be the same as S201. For details, refer to the description of S201.

S302: The first device determines, based on the information about a first parameter included in the first information, a first network analysis function associated with the AI model.

It should be understood that, after the first device determines, based on the information about the first parameter included in the first information, the first network analysis function associated with the AI model, the first device may determine second information.

This process may be the same as S205. For details, refer to the description of S205.

S303: The first device sends first indication information to a second device, where the first indication information indicates to the second device to establish an association relationship between the AI model and the first network analysis function. Correspondingly, the second device receives the first indication information.

The first indication information includes second information and the first information of the AI model. The second information indicates the first network analysis function associated with the AI model.

S304: The second device establishes the association relationship between the AI model and the first network analysis function based on the first indication information.

In a possible implementation, the second device determines, based on the second information of the AI model, a second management object corresponding to the first network analysis function. The second device configures, in a second management object corresponding to the first network analysis function, the first information of the AI model.

According to the solution of this application, the first information is used as a part of the second management object for management and control, so that a quantity of management and control objects in a network device can be reduced.

Optionally, the following step is performed. S305: The second device sends second response information to the first device, where the second response information indicates whether the second device successfully establishes the association relationship between the AI model and the first network analysis function.

This process may be the same as S208. For details, refer to the description of S208.

Currently, when a plurality of AI models exist and the AI models are continuously trained and updated, the network device does not know how to apply the AI models, and cannot manage the AI models. According to the solutions provided in this application, the first device obtains the first information that describes an AI model, and determines, based on the first information, the network analysis function associated with the AI model, so that the second device establishes the association relationship between the AI model and the network analysis function, to implement real-time management of the AI model.

Figure 4:
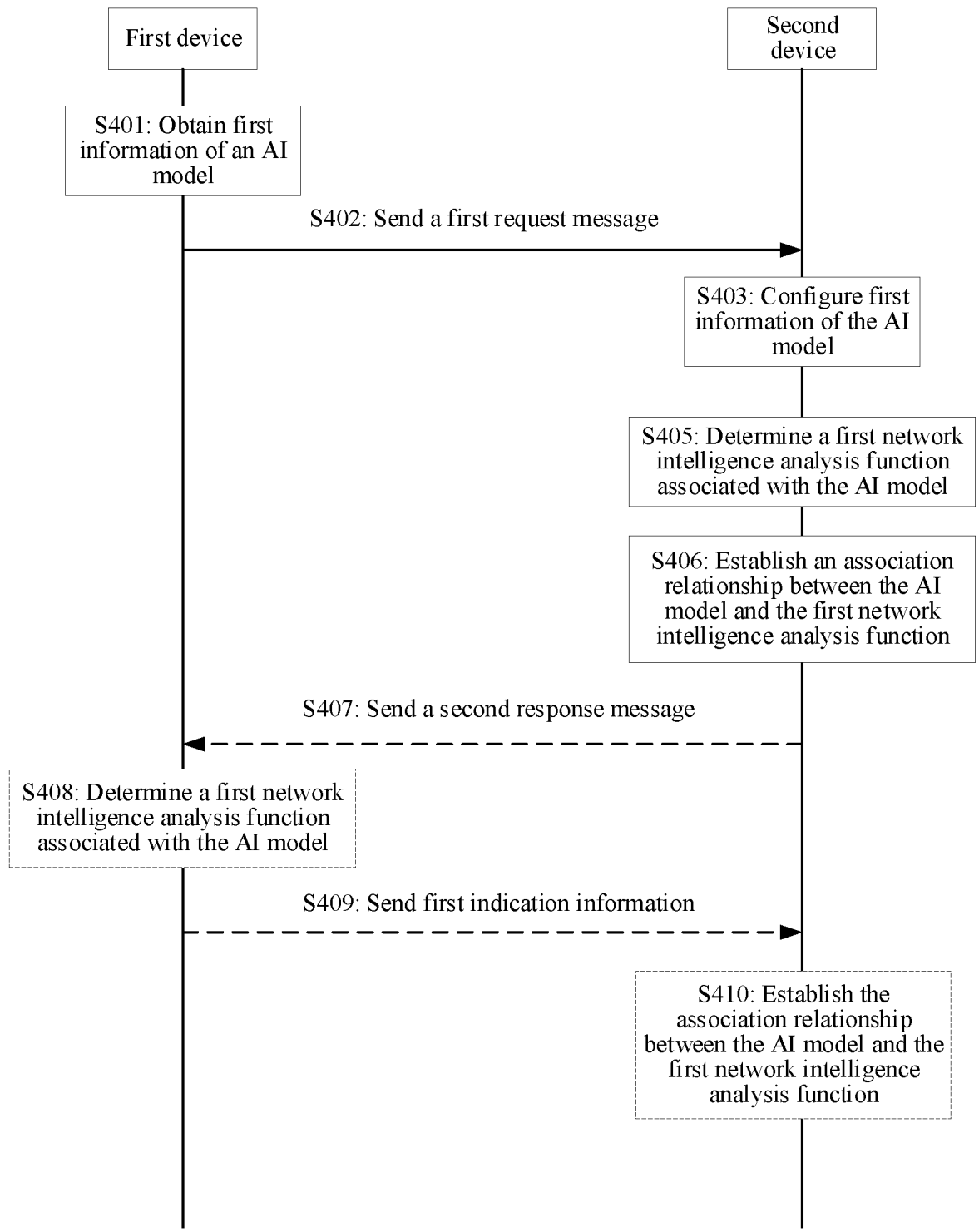
FIG. 4 shows still another implementation of solutions provided in this application.

FIG. 4 shows another implementation of the solutions provided in this application. Details are as follows:

S401: A first device obtains first information of an AI model.

This process may be the same as S201. For details, refer to the description of S201.

S402: The first device sends a first request message to a second device, where the first request message is used to request the second device to configure the first information of the AI model. Correspondingly, the second device receives the first request information.

This process may be the same as S202. For details, refer to the description of S202.

S403: The second device configures the first information of the AI model based on the first request information.

This process may be the same as S203. For details, refer to the description of S203.

Optionally, the following steps are performed. S404: The second device sends a first response message to the first device. The first response message indicates that the second device successfully configures the first information of the AI model.

S405: The second device determines, based on the information about a first parameter included in the first information, a first network analysis function associated with the AI model.

This process may be similar to S205, that is, in S405, the first device in S205 may be replaced with the second device. For other content, refer to the description of S205.

S406: The second device establishes an association relationship between the AI model and the first network analysis function.

This process may be the same as S207 in Manner 1 to Manner 3. For details, refer to descriptions of S207 in Manner 1 to Manner 3.

Optionally, the following step is performed. S407: The second device sends a second response message to the first device, where the second response message indicates whether the second device successfully establishes the association relationship between the AI model and the first network analysis function.

This process may be the same as S208. For details, refer to the description of S208.

Currently, when a plurality of AI models exist and the AI models are continuously trained and updated, the network device does not know how to apply the AI models, and cannot manage the AI models. According to the solution provided in this application, the second device obtains the first information that describes an AI model, and determines, based on the first information, the network analysis function associated with the AI model, so that the second device establishes the association relationship between the AI model and the network analysis function, to implement real-time management of the AI model.

In another possible implementation, after S401 to S407, the method may further include the following steps.

S408: The first device determines, based on the information about the first parameter included in the first information, a network analysis function associated with the AI model.

If the first network analysis function associated with the AI model determined by the first device is the same as the first network analysis function associated with the AI model determined by the second device in S405, the following step is not performed.

If the first network analysis function associated with the AI model determined by the first device is different from the first network analysis function associated with the AI model determined by the second device in S405, the following steps are performed.

The following uses an example to describe a case in which the first network analysis function associated with the AI model determined by the first device in S408 is different from the first network analysis function associated with the AI model determined by the second device in S405.

For example, in S405, the provider information of an AI model #1 indicates that the AI model #1 is provided by an operator #1, and the capability information of the AI model #1 indicates that the AI model #1 has a load information analysis capability; the provider information of a network analysis function #1 indicates that the network analysis function #1 is provided by the operator #1, and the capability information of the network analysis function #1 indicates that the network analysis function #1 has a load information analysis capability; and the provider information of a network analysis function #2 indicates that the network analysis function #1 is provided by an operator #2, and the capability information of the network analysis function #2 indicates that the network analysis function #2 has a load information analysis capability. In this case, the second device determines, based on the capability information of the AI model #1, that the AI model #1 is associated with the network analysis function #1 and the network analysis function #2.

That is, the second device does not consider the provider information of the AI model and provider information of the network analysis function when the second device determines the first network analysis function associated with the AI model.

However, in S408, the first device determines, based on the provider information of the AI model, the capability information of the AI model, the provider information of the network analysis function, and the capability information of the network analysis function, that the AI model #1 is associated with the network analysis function #1. In other words, if the first network analysis function associated with the AI model determined by the first device in S408 is different from the first network analysis function associated with the AI model determined by the second device in S405, the following steps continues to be performed.

It should be understood that the foregoing examples are merely examples for description, and this is not limited in this application.

S409: The first device sends first indication information to the second device, where the first indication information indicates the second device to establish an association relationship between the AI model and the first network analysis function. Correspondingly, the second device receives the first indication information.

This process may be the same as S206. For details, refer to the description of S206.

S410: The second device establishes the association relationship between the AI model and the first network analysis function based on the first indication information.

This process may be the same as S207. For details, refer to the description of S207.

Optionally, the following step is performed. S411: The second device sends a second response message to the first device, where the second response message indicates whether the second device successfully establishes the association relationship between the AI model and the first network analysis function.

This process may be the same as S208. For details, refer to the description of S208.

According to the solution of this application, after the second device determines a network analysis function associated with the AI model, the first device may determine a network analysis function associated with the AI model again, to improve accuracy.

Figure 5:
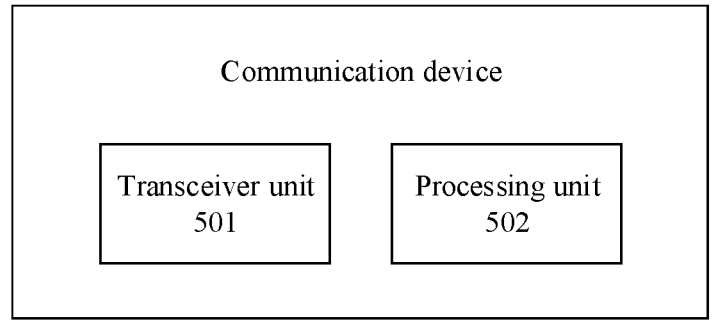
FIG. 5 is a schematic block diagram of a communication device according to this application.

According to the foregoing method, FIG. 5 shows a communication device according to an embodiment of this application. The communication device includes a transceiver unit 501 and a processing unit 502. The transceiver unit 501 is configured to implement content interaction between the communication device and another unit or network element. The processing unit 502 is configured to implement data processing by the communication device. It should be understood that the transceiver unit 501 in this embodiment of this application may be implemented by a transceiver or a transceiver-related circuit component, and the processing unit 502 may be implemented by a processor or a processor-related circuit component (or referred to as a processing circuit).

For example, the communication device may be a communication apparatus device, or may be a chip applied to a communication apparatus device, or another combined component, component, or the like that has a function of the foregoing communication apparatus device.

For example, when the communication device is a first device, the transceiver unit 501 and the processing unit 502 can support processes completed by the first device in the foregoing method examples.

For example, when the communication device is a second device, the transceiver unit 501 and the processing unit 502 can support processes completed by the second device in the foregoing method examples.

Figure 6:
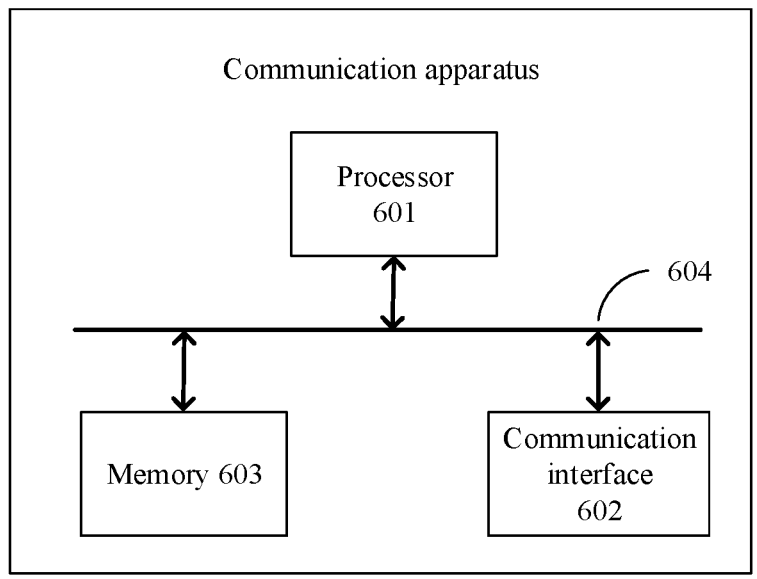
FIG. 6 is a schematic block diagram of a communication apparatus according to this application.

An embodiment of this application further provides a communication apparatus. As shown in FIG. 6, the communication apparatus includes: a processor 601, a communication interface 602, and a memory 603. The processor 601, the communication interface 602, and the memory 603 may be connected to each other through a bus 604. The bus 604 may be a peripheral component interconnect (PCI) bus, an extended industry standard architecture (EISA) bus, or the like. The bus 604 may be classified into an address bus, a data bus, a control bus, and the like. For ease of representation, the bus is represented by using only one thick line in FIG. 6, but it does not indicate that there is only one bus or only one type of bus. The processor 601 may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic logic array (GAL), or any combination thereof. The memory 603 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache.

The processor 601 is configured to implement a data processing operation of the communication apparatus. The communication interface 602 is configured to implement sending and receiving operations of the communication apparatus.

For example, when the communication apparatus is a first device, the processor 601, the communication interface 602, and the memory 603 can support processes completed by the first device in the foregoing method examples.

For example, when the communication apparatus is a second device, the processor 601, the communication interface 602, and the memory 603 can support processes completed by the second device in the foregoing method examples.

This application further provides a communication system. The communication system includes a first device and a second device. The communication system may be configured to implement the foregoing method.

This application further provides a computer-readable medium. The computer-readable medium stores a computer program (which may also be referred to as code or an instruction). When the computer program runs on a computer, the computer performs the foregoing method.

This application further provides a chip. A processing circuit is disposed on the chip, and the processing circuit is configured to perform the foregoing method.

The technical solutions in embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, a new radio (NR) system, or the like.

A terminal device in embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application may be a device configured to communicate with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like. This is not limited in embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

Persons skilled in the art can clearly understand that for convenience and brevity of description, reference may be made to corresponding processes in the foregoing method embodiment for specific working processes of the foregoing system, apparatus, and units. Details are not described herein again.

In the several embodiments provided in this application, it should be understood that the disclosed system, apparatus, and method may be implemented in other manners. For example, the foregoing apparatus embodiments are merely examples. For example, division of the units is merely illustrative and other divisions may be implemented during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, an optical disc, or the like.

The foregoing descriptions are merely specific implementations of this application, but the protection scope of this application is not limited thereto. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A network model management method applied to a first device, comprising:
    obtaining first information of a network model, wherein the first information describes the network model, the first information comprises information about a first parameter, and the information about the first parameter comprises one or more of the following: provider information of the network model, capability information corresponding to the network model, or application scope information corresponding to the network model, wherein the provider information of the network model indicates a vendor or an operator that provides the network model, the capability information corresponding to the network model indicates a capability of the network model, and the application scope information corresponding to the network model indicates a scope in which the network model can be applied;
    determining second information based on the information about the first parameter comprised in the first information, wherein the second information indicates a network analysis function allowed to use the network model, and the second information comprises one or more of the following: provider information of the network analysis function, application scope information corresponding to the network analysis function, capability information corresponding to the network analysis function, or identification information of the network analysis function, wherein the provider information of the network analysis function indicates a vendor or an operator that provides the network analysis function, the capability information corresponding to the network analysis function indicates a capability of the network analysis function, and the application scope information corresponding to the network analysis function indicates a scope in which the network analysis function is allowed to be used; and
    sending the first information and the second information,
    wherein the determining the second information that indicates the network analysis function allowed to use the network model comprises one or more of:
    determining, based on the provider information of the network model in the first information, the network analysis function allowed to use the network model,
    determining, based on the capability information corresponding to the network model in the first information, the network analysis function allowed to use the network model, or
    determining, based on the application scope information correspponding to the network model in the first information, the network analysis function allowed to use the network model.

2. The method according to claim 1, wherein the first information further comprises third information, and the third information comprises one or more of the following:
    identification information of the network model, version information of the network model, file name information of the network model, file address information of the network model, status information of the network model, sharing information of the network model, or self-training information of the network model; and
    wherein the status information indicates whether the network model is allowed to be used, the sharing information indicates whether the network model is allowed to be used by a plurality of network analysis functions at the same time, and the self-training information indicates whether the network model is allowed to be updated locally.

3. The method according to claim 1, wherein the obtaining the first information of the network model comprises:
    obtaining, by the first device, the first information from a third device; or
    training, by the first device, the network model to generate the first information.

4. The method according to claim 1, wherein the second information is configured in the first device.

5. A network model management method applied to a second device, comprising:
    receiving first information and second information from a first device, wherein
    the first information describes a network model, the first information comprises information about a first parameter, and the information about the first parameter comprises one or more of the following: provider information of the network model, capability information corresponding to the network model, or application scope information corresponding to the network model, wherein the provider information of the network model indicates a vendor or an operator that provides the network model, the capability information corresponding to the network model indicates a capability of the network model, and the application scope information corresponding to the network model indicates a scope in which the network model can be applied, the second information indicates a network analysis function allowed to use the network model, the second information is determined by the first device based on information about the first parameter in the first information, and the second information comprises one or more of the following: provider information of the network analysis function, application scope information corresponding to the network analysis function, capability information corresponding to the network analysis function, or identification information of the network analysis function, wherein the provider information of the network analysis function indicates a vendor or an operator that provides the network analysis function, the capability information corresponding to the network analysis function indicates a capability of the network analysis function, and the application scope information corresponding to the network analysis function indicates a scope in which the network analysis function is allowed to be used; and establishing an association relationship between the network model and the network analysis function based on the first information and the second information.

6. The method according to claim 5, wherein the first information further comprises third information;

the third information comprises one or more of the following:

identification information of the network model, version information of the network model, file name information of the network model, file address information of the network model, status information of the network model, sharing information of the network model, or self-training information of the network model; and the status information indicates whether the network model is allowed to be used, the sharing information indicates whether the network model is allowed to be used by a plurality of network analysis functions at the same time, and the self-training information indicates whether the network model is allowed to be updated locally.

7. The method according to claim 5, wherein the method further comprises:

configuring, in a first management object corresponding to the network model, the first information, wherein the first management object describes configuration information of the network model.

8. The method according to claim 5, wherein the establishing of the association relationship between the network model and the network analysis function based on the first information and the second information comprises:

configuring, in a first management object corresponding to the network model, the identification information of the network analysis function, wherein the first management object describes the configuration information of the network model;

configuring, in a second management object corresponding to the network analysis function, identification information of the network model, wherein the second management object describes configuration information of the network analysis function; or configuring, in a third management object, the identification information of the network analysis function and the identification information of the network model.

9. The method according to claim 5, wherein the second information is configured in the first device.

10. An apparatus, comprising:

at least one processor; and a memory coupled to the at least one processor and having program instructions stored thereon which, when executed by the at least one processor, cause the apparatus to:

obtain first information of a network model, wherein the first information describes the network model, the first information comprises information about a first parameter, and the information about the first parameter comprises one or more of the following: provider information of the network model, capability information corresponding to the network model, or application scope information corresponding to the network model, wherein the provider information of the network model indicates a vendor or an operator that provides the network model, the capability information corresponding to the network model indicates a capability of the network model, and the application scope information corresponding to the network model indicates a scope in which the network model can be applied;

determine second information based on the first information, wherein the second information indicates a network analysis function allowed to use the network model, and the second information comprises one or more of the following: provider information of the network analysis function, application scope information corresponding to the network analysis function, capability information corresponding to the network analysis function, or identification information of the network analysis function, wherein the provider information of the network analysis function indicates a vendor or an operator that provides the network analysis function, the capability information corresponding to the network analysis function indicates a capability of the network analysis function, and the application scope information corresponding to the network analysis function indicates a scope in which the network analysis function is allowed to be used; and send the first information and the second information, wherein the determining the second information that indicates the network analysis function allowed to use the network model comprises one or more of:

determining, based on the provider information of the network model in the first information, the network analysis function allowed to use the network model, determining, based on the capability information corresponding to the network model in the first information, the network analysis function allowed to use the network model, or determining, based on the application scope information corresponding to the network model in the first information, the network analysis function allowed to use the network model.

11. The apparatus according to claim 10, wherein the first information further comprises third information, and the third information comprises one or more of the following:

identification information of the network model, version information of the network model, file name information of the network model, file address information of the network model, status information of the network model, sharing information of the network model, or self-training information of the network model; and wherein the status information indicates whether the network model is allowed to be used, the sharing information indicates whether the network model is allowed to be used by a plurality of network analysis functions at the same time, and the self-training information indicates whether the network model is allowed to be updated locally.

12. The apparatus according to claim 10, wherein to obtain the first information of the network model, the program instructions cause the apparatus to:
obtain the first information from a third device; or
train the network model to generate the first information.

13. The apparatus according to claim 10, wherein the second information is configured in the first device.

14. An apparatus, comprising:
at least one processor; and
a memory coupled to the at least one processor and having program instructions stored thereon which, when executed by the at least one processor, cause the apparatus to:
receive first information and second information from a first device, wherein
the first information describes a network model, the first information comprises information about a first parameter, and the information about the first parameter comprises one or more of the following: provider information of the network model, capability information corresponding to the network model, or application scope information corresponding to the network model, wherein the provider information of the network model indicates a vendor or an operator that provides the network model, the capability information corresponding to the network model indicates a capability of the network model, and the application scope information corresponding to the network model indicates a scope in which the network model can be applied,
the second information indicates a network analysis function allowed to use the network model, the second information is determined by the first device based on information about the first parameter in the first information, and the second information comprises one or more of the following: provider information of the network analysis function, application scope information corresponding to the network analysis function, capability information corresponding to the network analysis function, or identification information of the network analysis function, wherein the provider information of the network analysis function indicates a vendor or an operator that provides the network analysis function, the capability information corresponding to the network analysis function indicates a capability of the network analysis function, and the application scope information corresponding to the network analysis function indicates a scope in which the network analysis function is allowed to be used; and
establish an association relationship between the network model and the network analysis function based on the first information and the second information.

15. The apparatus according to claim 14, wherein the first information comprises third information,
wherein the third information comprises one or more of the following:
identification information of the network model, version information of the network model, file name information of the network model, file address information of the network model, status information of the network model, sharing information of the network model, or self-training information of the network model; and
the status information indicates whether the network model is allowed to be used, the sharing information indicates whether the network model is allowed to be used by a plurality of network analysis functions at the same time, and the self-training information indicates whether the network model is allowed to be updated locally.

16. The apparatus according to claim 14, wherein the program instructions further cause the apparatus to:
configure, in a first management object corresponding to the network model, the first information, wherein the first management object is used to describe configuration information of the network model.

17. The apparatus according to claim 14, wherein the establishing of the association relationship between the network model and the network analysis function based on the first information and the second information comprises:
configuring, in a first management object corresponding to the network model, the identification information of the network analysis function, wherein the first management object is used to describe the configuration information of the network model;
configuring, in a second management object corresponding to the network analysis function, identification information of the network model, wherein the second management object is used to describe configuration information of the network analysis function; or
configuring, in a third management object, the identification information of the network analysis function and the identification information of the network model.

18. The apparatus according to claim 14, wherein the second information is configured in the first device.

* * * * *